(12) United States Patent
Joo

(10) Patent No.: US 10,306,123 B2
(45) Date of Patent: May 28, 2019

(54) CAMERA MODULE

(71) Applicant: LG Innotek Co., Ltd., Seoul (KR)

(72) Inventor: Young Sang Joo, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 211 days.

(21) Appl. No.: 15/021,814

(22) PCT Filed: Sep. 12, 2014

(86) PCT No.: PCT/KR2014/008528
§ 371 (c)(1),
(2) Date: Mar. 14, 2016

(87) PCT Pub. No.: WO2015/037942
PCT Pub. Date: Mar. 19, 2015

(65) Prior Publication Data
US 2016/0234413 A1 Aug. 11, 2016

(30) Foreign Application Priority Data

Sep. 13, 2013 (KR) .................... 10-2013-0110497

(51) Int. Cl.
*H04N 5/225* (2006.01)
*B60R 11/04* (2006.01)

(52) U.S. Cl.
CPC .......... *H04N 5/2257* (2013.01); *B60R 11/04* (2013.01); *H04N 5/2252* (2013.01); *H04N 5/2253* (2013.01)

(58) Field of Classification Search
CPC .. H04N 5/2251; H04N 5/2252; H04N 5/2253; H04N 5/2254; H04N 5/2257; B60K 11/04
See application file for complete search history.

(56) References Cited

U.S. PATENT DOCUMENTS 4,369,459 A * 1/1983 Iwasawa ................ H04N 5/335
348/258
5,145,387 A * 9/1992 Ichihashi ........... H01R 13/6474
333/260

(Continued)

FOREIGN PATENT DOCUMENTS

CN 202033746 U 11/2011
CN 103281488 A 9/2013

(Continued)

OTHER PUBLICATIONS

Machine generated translation of JP2007114421 to Semba, May 2007.*

(Continued)

*Primary Examiner* — David E Harvey
(74) *Attorney, Agent, or Firm* — Saliwanchik, Lloyd & Eisenschenk

(57) ABSTRACT

Disclosed is a vehicular camera module having an improved printed circuit board arrangement to downsize the apparatus. A printed circuit board according to one embodiment of the present invention has an image sensor and at least one connector arranged thereon, and can comprise at least one auxiliary substrate connected to the printed circuit board at a predetermined angle by the connector, and an housing attached to the printed circuit board.

19 Claims, 14 Drawing Sheets

(56) References Cited

U.S. PATENT DOCUMENTS

| | | | | |
|---|---|---|---|---|
| 5,381,176 | A | * | 1/1995 | Tanabe ................. G11B 31/006 348/273 |
| 5,748,448 | A | * | 5/1998 | Hokari ................ H01L 31/0203 174/541 |
| 5,821,994 | A | * | 10/1998 | Tani .................... H04N 5/23209 348/222.1 |
| 6,173,119 | B1 | * | 1/2001 | Manico ................. B65H 1/266 396/208 |
| 6,567,115 | B1 | * | 5/2003 | Miyashita .............. A61B 1/051 348/76 |
| 6,635,865 | B1 | * | 10/2003 | Soltyk ................ H04N 1/02805 250/208.1 |
| 6,643,917 | B1 | * | 11/2003 | Gieskes ............. H05K 13/0452 198/345.3 |
| 6,731,341 | B1 | * | 5/2004 | Uchiyama ............ H04N 5/2253 348/374 |
| 6,830,387 | B2 | * | 12/2004 | Rife ................. G08B 13/19619 250/363.02 |
| 7,208,716 | B2 | * | 4/2007 | Belau ................. H04N 5/2251 250/208.1 |
| 7,277,242 | B1 | * | 10/2007 | Wang ....................... G02B 7/02 359/808 |
| 7,466,360 | B2 | * | 12/2008 | Lee ..................... H04N 5/2251 348/143 |
| 8,098,309 | B2 | * | 1/2012 | Takagi .................... H01L 25/16 348/294 |
| 8,698,887 | B2 | * | 4/2014 | Makino ................ H04N 5/2254 348/76 |
| 9,065,995 | B2 | * | 6/2015 | Hirakawa ............ H04N 5/2254 |
| 9,167,161 | B1 | * | 10/2015 | Tam ..................... H04N 5/2253 |
| 9,185,287 | B2 | * | 11/2015 | Kim ..................... H04N 5/2257 |
| 9,277,108 | B2 | * | 3/2016 | Shin ......................... G03B 3/02 |
| 9,392,147 | B2 | * | 7/2016 | Lee ........................ G03B 17/02 |
| 9,432,580 | B2 | * | 8/2016 | Shimizu ................... G03B 5/00 |
| 9,628,678 | B2 | * | 4/2017 | Kim ....................... G03B 11/00 |
| 9,628,679 | B2 | * | 4/2017 | Jannard ................ H04N 5/2252 |
| 2002/0186245 | A1 | * | 12/2002 | Chandhoke ........ G05B 19/0426 715/764 |
| 2003/0193571 | A1 | * | 10/2003 | Schultz .................. H04N 5/225 348/207.99 |
| 2004/0002255 | A1 | * | 1/2004 | Ueda ....................... H01R 12/79 439/495 |
| 2004/0060032 | A1 | | 3/2004 | McCubbrey |
| 2005/0270414 | A1 | * | 12/2005 | Lee ................. G08B 13/19619 348/373 |
| 2006/0004256 | A1 | * | 1/2006 | Gilad ..................... A61B 1/041 600/160 |
| 2006/0055820 | A1 | * | 3/2006 | Lyon ................ G08B 13/19619 348/373 |
| 2006/0103727 | A1 | | 5/2006 | Tseng |
| 2007/0173084 | A1 | | 7/2007 | Wang |
| 2009/0046150 | A1 | * | 2/2009 | Hayakawa ........... H04N 5/2253 348/148 |
| 2009/0161006 | A1 | | 6/2009 | Lee |
| 2009/0237629 | A1 | | 9/2009 | Koo |
| 2011/0080515 | A1 | | 4/2011 | Kang |
| 2011/0096224 | A1 | | 4/2011 | Lee |
| 2011/0118549 | A1 | * | 5/2011 | Han ......................... A61B 1/04 600/109 |
| 2011/0298970 | A1 | * | 12/2011 | Shinohara .............. G03B 17/14 348/373 |
| 2012/0019675 | A1 | | 1/2012 | Brown |
| 2012/0155852 | A1 | * | 6/2012 | Hou ....................... G03B 17/12 396/529 |
| 2013/0155311 | A1 | * | 6/2013 | Grandin ............... H04N 5/2257 348/335 |
| 2013/0215311 | A1 | * | 8/2013 | Uemura ............... H04N 5/2253 348/308 |
| 2013/0222685 | A1 | * | 8/2013 | Topliss ................ G02B 27/646 348/373 |
| 2013/0292477 | A1 | * | 11/2013 | Hennick ............ G06K 7/10732 235/469 |
| 2014/0043525 | A1 | * | 2/2014 | Azuma .................. H04N 5/232 348/357 |
| 2014/0160284 | A1 | * | 6/2014 | Achenbach .......... H04N 5/2251 348/143 |
| 2015/0163924 | A1 | * | 6/2015 | Cho ........................ H05K 3/305 174/259 |
| 2015/0229843 | A1 | * | 8/2015 | Shimizu ................... G03B 5/00 348/222.1 |
| 2016/0025995 | A1 | * | 1/2016 | Ariji ....................... G02B 7/08 359/557 |
| 2016/0202494 | A1 | * | 7/2016 | Seo .......................... G03B 5/00 359/557 |

FOREIGN PATENT DOCUMENTS

| | | | |
|---|---|---|---|
| EP | 1689166 A1 | * | 8/2006 |
| JP | 63272180 A | * | 11/1988 |
| JP | 05-236306 A | * | 9/1993 |
| JP | 09098320 A | * | 4/1997 |
| JP | 10-012851 A | * | 1/1998 |
| JP | 2007-114421 A | * | 5/2007 |
| JP | 2007114421 A | * | 5/2007 |
| KR | 10-0557140 B1 | | 3/2006 |
| KR | 10-2006-0045204 A | | 5/2006 |
| KR | 10-2006-0051099 A | | 5/2006 |
| KR | 10-2014-0048720 A | | 4/2014 |
| WO | WO 00/46984 | * | 8/2000 |
| WO | WO-2012/157985 A2 | | 11/2012 |

OTHER PUBLICATIONS

Supplementary European Search Report dated Apr. 24, 2017 in European Application No. 14843346.9.

Office Action dated Mar. 29, 2017 in Chinese Application No. 201480050654.3.

International Search Report in International Application No. PCT/KR2014/008528, filed Sep. 12, 2014.

* cited by examiner

CAMERA MODULE

CROSS-REFERENCE TO RELATED APPLICATIONS

This application is the U.S. national stage application of International Patent Application No. PCT/KR2014/008528, filed Sep. 12, 2014, which claims priority to Korean Application No. 10-2013-0110497, filed Sep. 13, 2013, the disclosures of each of which are incorporated herein by reference in their entirety.

The present application is based on, and claims priority from the Korean Patent Application Number 10-2013-0110497 filed on Sep. 13, 2013, the entire content of which is incorporated by reference herein in its entirety.

TECHNICAL FIELD

The present disclosure relates to a camera module.

BACKGROUND

As miniaturization of a camera module is enabled, the camera module is recently being installed on front and rear of an automobile in order to provide driving convenience and better visibility of blind spot for a driver, and the camera module is being installed in a mobile device such as a tablet PC or a smartphone as well. Unlike in a camera module installed in a mobile device, anti-dust characteristic and anti-rust characteristic are very important in a camera module for a vehicle, and because the volume of the vehicle is comparatively larger than that of the mobile device, the design of the camera module for vehicle is focused on reliability and stability over miniaturization.

However, as the number of pixels in an image sensor installed in a camera module has increased in recent years, the size of an element component such as an ISP (Image Signal Processor) has also increased. Thus, it becomes difficult to mount all element components in a single PCB (Printed Circuit Board), such that multiple PCBs are formed by being laminated. Thereby, there is a problem in that the entire length of the camera module becomes longer.

SUMMARY

One technical challenge that the proposed exemplary embodiments aim to achieve is, to provide a camera module for a vehicle, where a PCB arrangement structure of the camera module is improved for miniaturization of the device.

In order to achieve the foregoing technical challenge, in a general aspect, there is provided a camera module, comprising: a PCB arranged with an image sensor and at least one connector; at least one subsidiary substrate connected at a predetermined angle to the PCB, by the connector; and a housing coupled to the PCB.

In some exemplary embodiments, the subsidiary substrate may be connected to the PCB in a direction vertical to the PCB.

In some exemplary embodiments, the connector may be arranged on a same surface as that on which the image sensor is arranged.

In some exemplary embodiments, the connector may be arranged in a direction parallel to distal end of the PCB.

In some exemplary embodiments, the housing may include at least one first accommodating groove accommodating the at least one subsidiary substrate.

In some exemplary embodiments, a shape of the first accommodating groove may correspond to that of the subsidiary substrate.

In some exemplary embodiments, the connector may be arranged on a surface reverse to a surface on which the image sensor is arranged.

In some exemplary embodiments, the connector may be arranged in a direction parallel to a distal end of the PCB.

In some exemplary embodiments, the at least one connector may be arranged in a direction parallel to each other.

In some exemplary embodiments, the camera module may further comprise: a cable housing connected to the PCB, and installed with a cable for external connection, wherein the cable housing may include at least one second accommodating groove accommodating the at least one subsidiary substrate.

In some exemplary embodiments, the connector may be formed by being protruded from a distal end of the PCB.

In some exemplary embodiments, the subsidiary substrate may include a connecting portion responding to the connector.

In some exemplary embodiments, the connecting portion may be formed of a flexible material.

In some exemplary embodiments, the subsidiary substrate may be so connected as to form a direction opposite to a direction to which the image sensor is arranged.

In some exemplary embodiments, the camera module may further comprise: a cable housing connected to the PCB, and installed with a cable for external connection, wherein the cable housing may include at least one third accommodating groove accommodating the at least one subsidiary substrate.

In some exemplary embodiments, the subsidiary substrate may be so connected as to form a same direction as that to which the image sensor is arranged.

In some exemplary embodiments, the housing may include at least one fourth accommodating groove accommodating the at least one subsidiary substrate.

According to an exemplary embodiment, the subsidiary substrate may be arranged in an internal space of the housing forming the camera module. Thereby, the size of the camera module can be minimized to the extent of the volume provided for installation of the subsidiary substrate in the conventional camera module.

In addition, according to an exemplary embodiment, various types of PCBs may be modularized to be installed. Thereby, control modules having various functions can be provided as options.

DETAILED DESCRIPTION

Various exemplary embodiments will be described more fully hereinafter with reference to the accompanying drawings, in which some exemplary embodiments are shown. The present inventive concept may, however, be embodied in many different forms and should not be construed as limited to the exemplary embodiments set forth herein. Rather, the described aspect is intended to embrace all such alterations, modifications, variations, and equivalents that fall within the scope and novel idea of the present disclosure.

Hereinafter, exemplary embodiments of the present disclosure will be described in detail with reference to the accompanying drawings.

Figure 1:
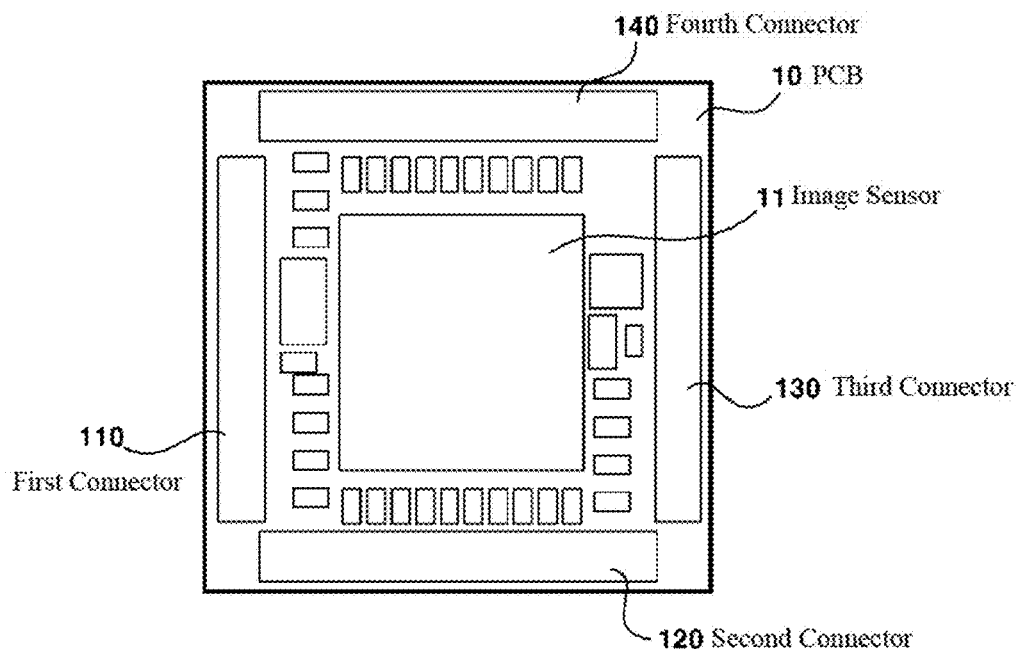
FIG. 1 is a plan view illustrating a PCB of a camera module according to a first exemplary embodiment.

FIG. 1 is a plan view illustrating a PCB of a camera module according to a first exemplary embodiment.

As illustrated in FIG. 1, a plurality of driver elements may be arranged on a PCB (10), and an image sensor (11) may be arranged at a center of the PCB (10). Here, the PCB (10) may be in a tetragonal shape, where first to fourth connectors (110~140) may be arranged around each edge of the tetragonal PCB (10). The first to fourth connectors (110~140) may be connected to first to fourth subsidiary substrates (210~240) as illustrated in FIGS. 2 and 3.

Figure 2:
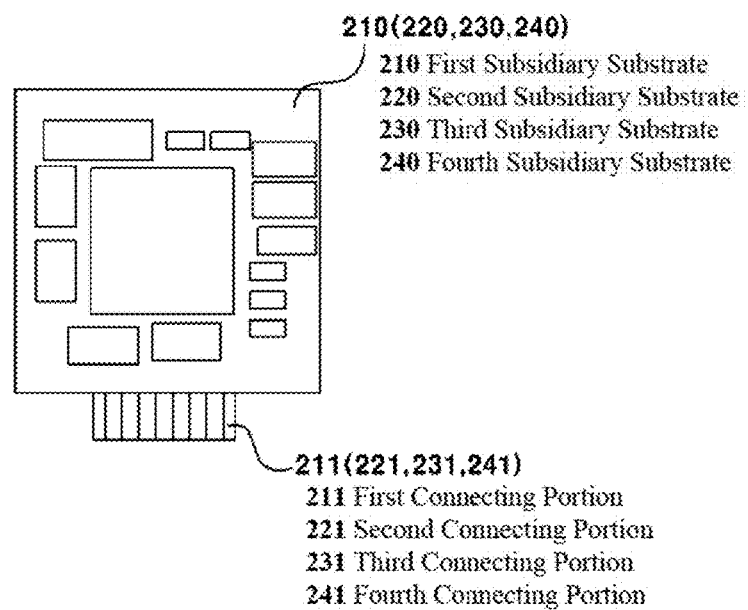
FIG. 2 is an exemplary view illustrating an example of a subsidiary substrate connected to a PCB.

FIG. 2 is an exemplary view illustrating an example of a first subsidiary substrate (210). A first connecting portion (211) connected to the first connector (110) may be provided at the first subsidiary substrate (210). Here, the first connector (110) may be a female connector, and the first connecting portion (211) may be a male connector. Alternatively, although it is not illustrated, the first connector (110) may be a male connector, and the first connecting portion (211) may be a female connector. A circuit component including a driver module for driving the image sensor (11) may be arranged on the first subsidiary substrate (210).

Meanwhile, the first to fourth connectors (110~140) and the first to fourth subsidiary substrates (210~240) may be formed to have the same standard with each other, respectively. Therefore, in a case where only the first subsidiary substrate (210) is required to be connected, the first subsidiary substrate (210) may be connected to any one of the first to fourth connectors (110~140) to be operated. In such case, the remaining connectors may not be provided, because they are not required.

Figure 3:
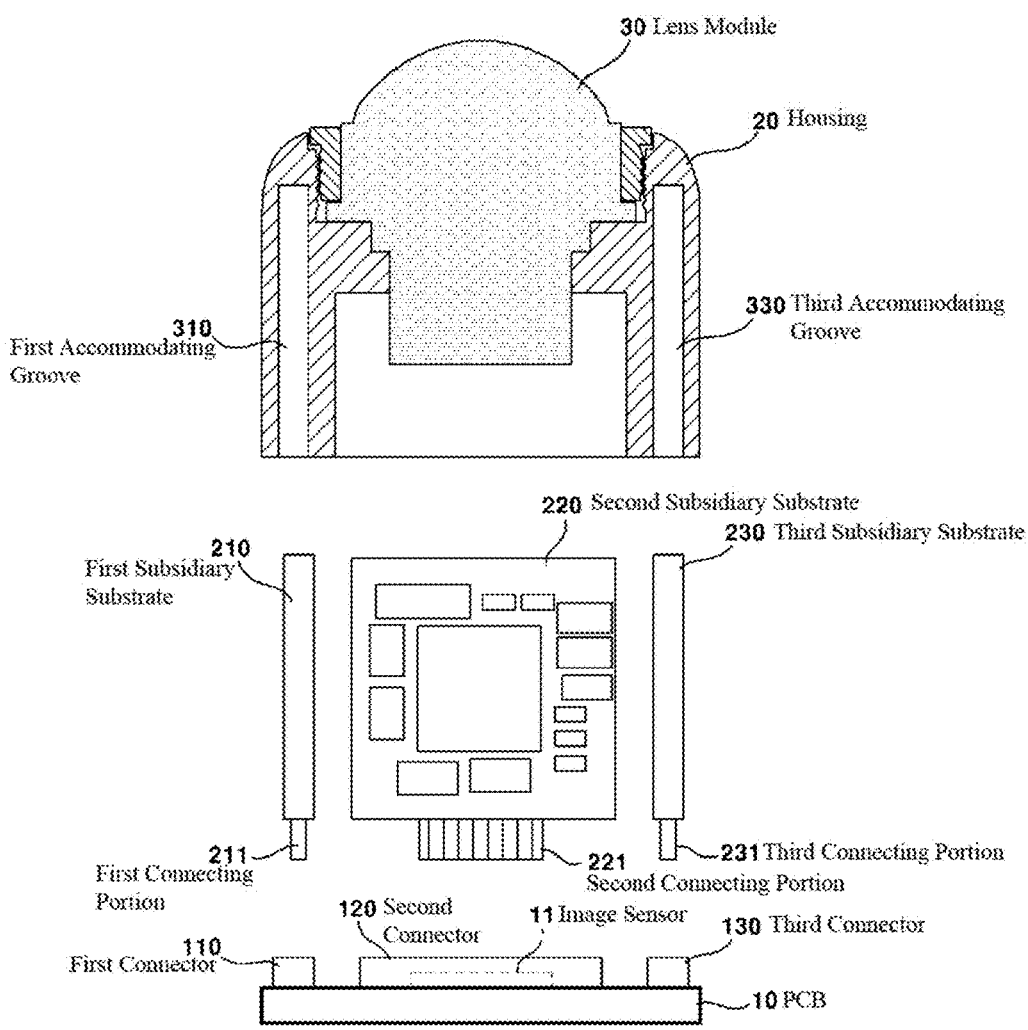
FIG. 3 is an exploded view illustrating a camera module according to a first exemplary embodiment.

FIG. 3 is an exploded view illustrating a camera module according to a first exemplary embodiment.

As illustrated in FIG. 3, a housing (20) forming an external appearance of the camera module may be coupled to an upper side of the PCB (10), where a lens module (30) may be installed at a center of the housing (20).

Meanwhile, first and third accommodating grooves (310, 330) in shapes corresponding to the first and third subsidiary substrates (210, 230) may be formed at positions corresponding to those of the first and third subsidiary substrates (210, 230). In addition, although it is not illustrated, second and fourth accommodating grooves in shapes corresponding to the second and fourth subsidiary substrates (220, 240) may be formed at positions corresponding to those of the second and fourth subsidiary substrates (220, 240).

Figure 4:
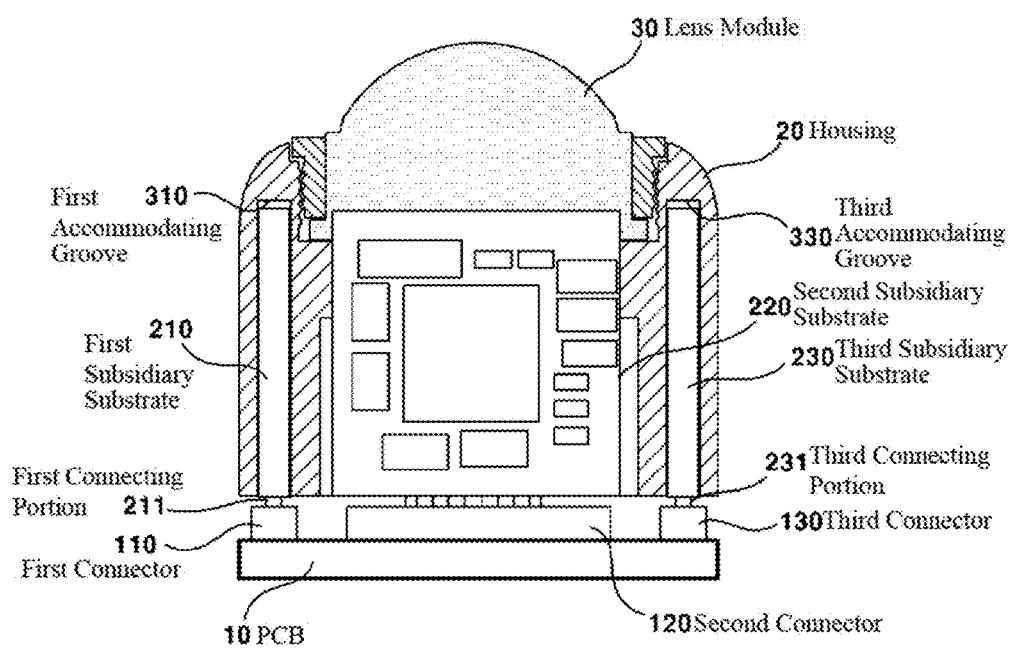
FIG. 4 is an assembly view illustrating a camera module according to a first exemplary embodiment.

According to such configuration, as illustrated in FIG. 4, the first to fourth subsidiary substrates (210~240) may be coupled by being inserted in internal spaces of the housing (20). Thereby, the height of the camera module may be lowered in comparison with the conventional structure where the subsidiary substrates are laminated on the PCB (10), such that the camera module can be miniaturized.

Figure 5:
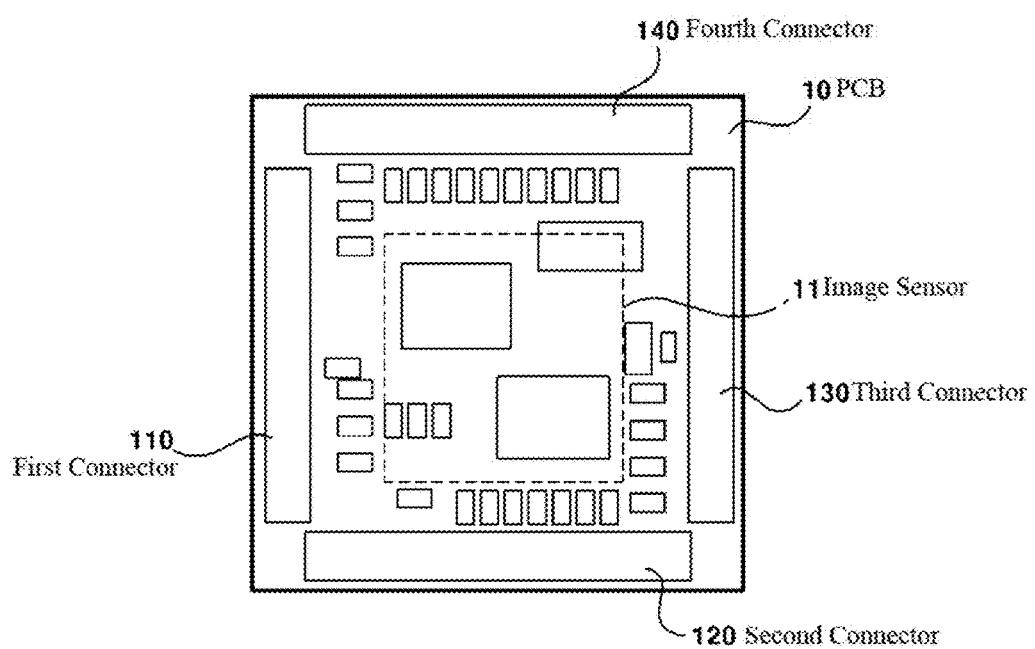
FIG. 5 is a plan view illustrating a PCB of a camera module according to a second exemplary embodiment.
Figure 6:
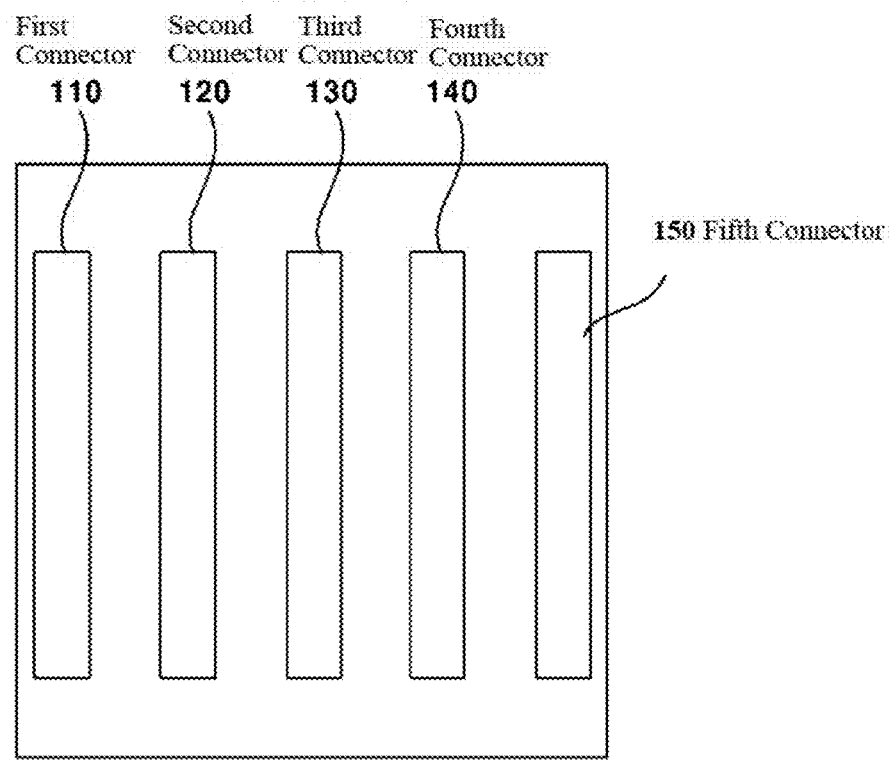
FIG. 6 is a plan view illustrating a PCB of a camera module according to a third exemplary embodiment.

FIG. 5 is a plan view illustrating a PCB of a camera module according to a second exemplary embodiment, and FIG. 6 is a plan view illustrating a PCB of a camera module according to a third exemplary embodiment.

As illustrated in FIG. 5, the first to fourth connectors (110~140) presented in the first exemplary embodiment may be formed on a surface reverse to a surface of the PCB (10) on which the image sensor (11) is mounted. Here, other driver elements and circuit components may be configured with the first to fourth connectors (110~140).

Here, the first to fourth connectors (110~140) may be arranged at positions adjacent to distal ends of the PCB (10) as in the foregoing first exemplary embodiment, as illustrated in FIG. 5. Alternatively, each of the first to fourth connectors (110~140) may be arranged in parallel, as illustrated in FIG. 6. Here, more than four connectors may be provided, as illustrated in FIG. 6.

Figure 7:
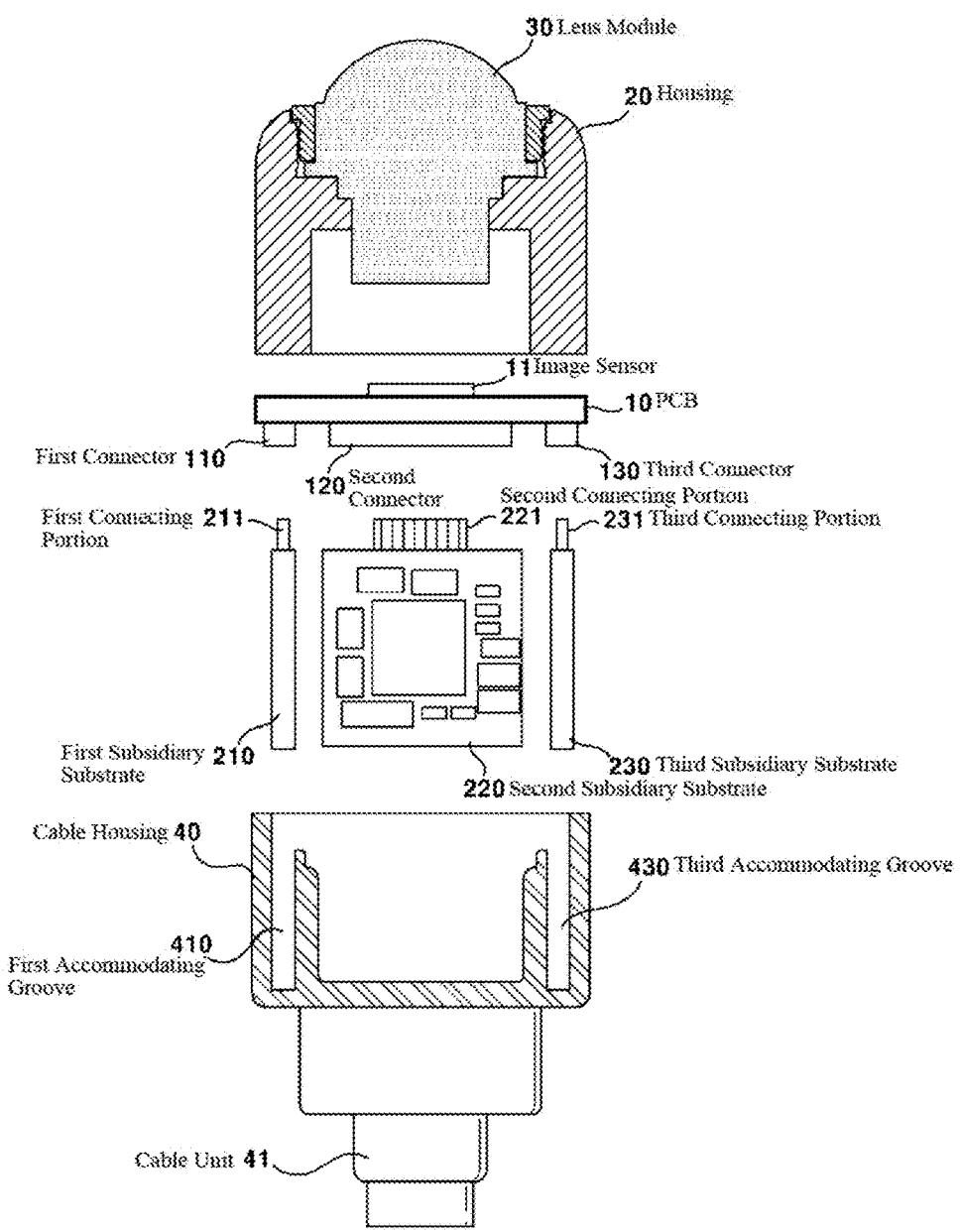
FIG. 7 is an exploded view illustrating a camera module according to a second exemplary embodiment.

FIG. 7 is an exploded view illustrating a camera module according to a second exemplary embodiment. According to the second exemplary embodiment, as illustrated in FIG. 7, the first to fourth subsidiary substrates (210~240) coupled to the first to fourth connectors (110~140) may be connected to a lower side of the PCB (10), and may be accommodated in a cable housing (40) supporting a cable unit (41). Here, as illustrated in FIG. 7, the first and third subsidiary substrates (210, 230) may be accommodated in the first and third accommodating grooves (410, 430) formed at the cable housing (40). In addition, although it is not illustrated, the second and fourth subsidiary substrates (220, 240) may be accommodated in the same manner.

Figure 8:
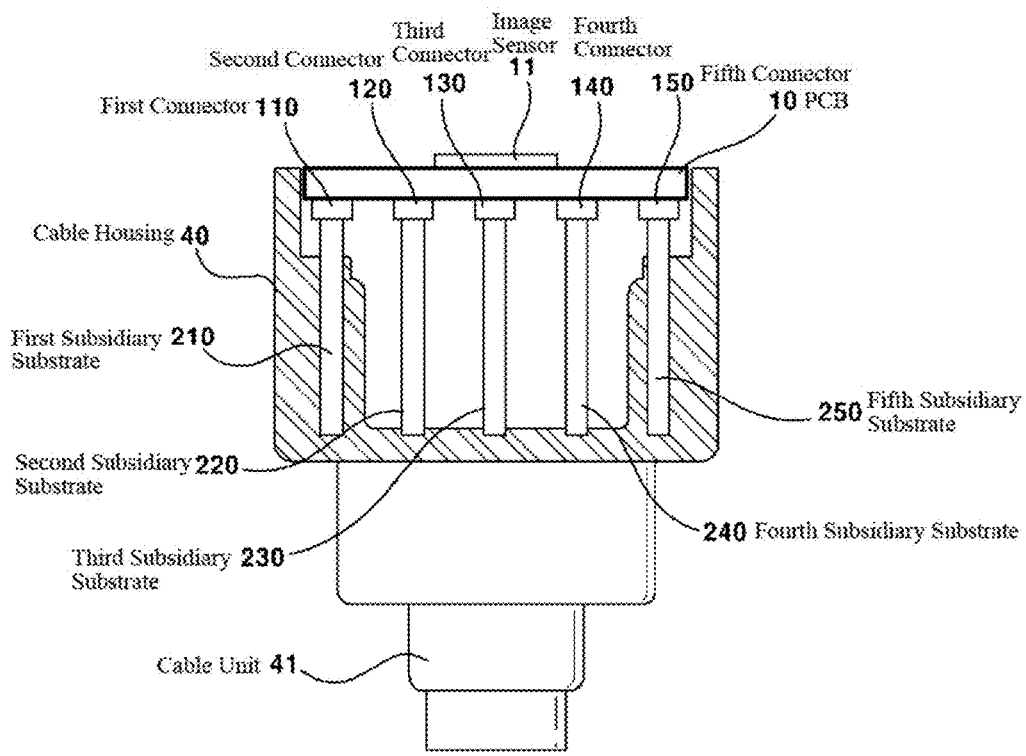
FIG. 8 is an assembly view illustrating a camera module according to a third exemplary embodiment.

FIG. 8 is an assembly view illustrating a camera module according to a third exemplary embodiment. According to the third exemplary embodiment, as illustrated in FIG. 8, the first to fourth subsidiary substrates (210~240) may be coupled in parallel to the first to fourth connectors (110~140), respectively. Here, when a fifth connector (150) is additionally installed, a fifth subsidiary substrate (150) may be possibly connected to the fifth connector (150). Here, a spaced portion may be formed in the cable housing (40), where the first to fifth subsidiary substrates (210~250) can be installed in the spaced portion. These first to fifth subsidiary substrates (210~250) may be so installed as not to interfere with the cable unit (41).

FIGS. 9 to 12 are views illustrating an example of a camera module according to a fourth exemplary embodiment. Unlike the foregoing first to third exemplary embodiments, according to the fourth exemplary embodiment, the first to fourth connectors (110~140) may be formed by being protruded on each side of the PCB (10) in a length direction.

Figure 9:
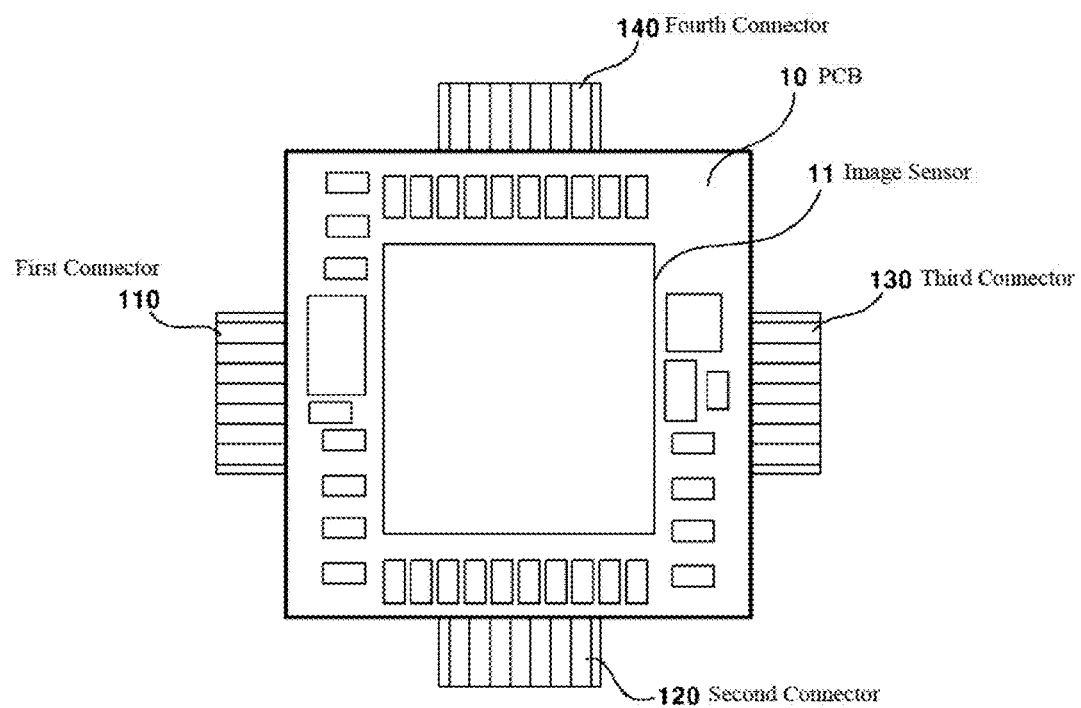
FIG. 9 is a plan view illustrating a PCB of a camera module according to a fourth exemplary embodiment.
Figure 10:
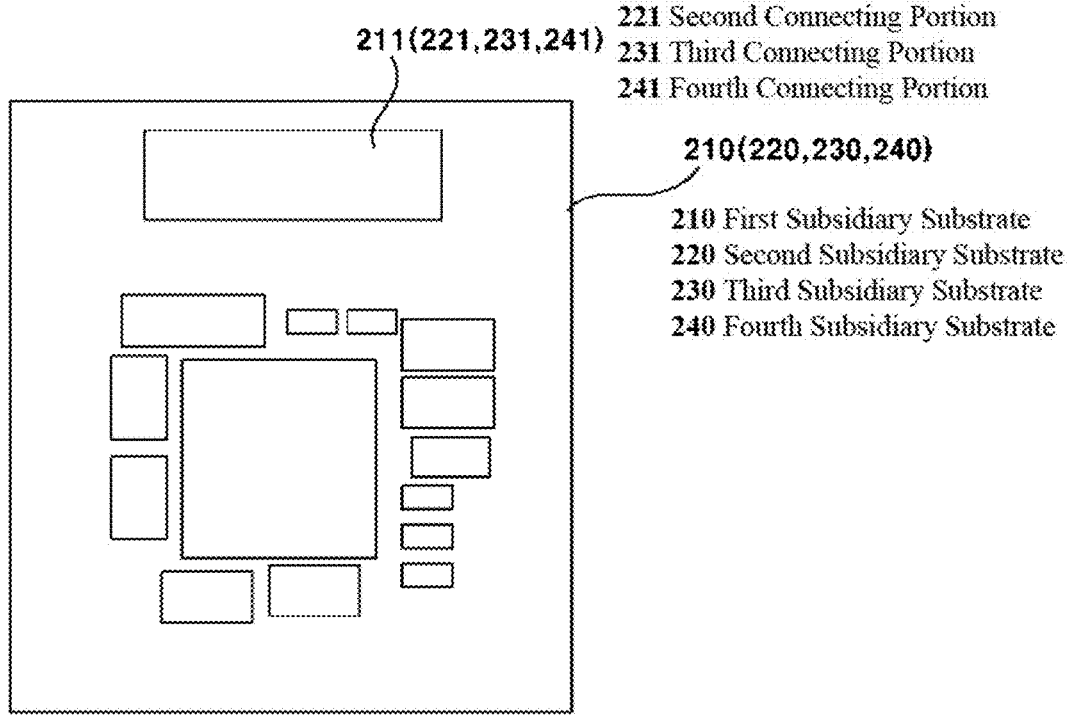
FIG. 10 is an exemplary view illustrating an example of a subsidiary substrate applied in a fourth exemplary embodiment.

In such case, as illustrated in FIG. 10, first to fourth connecting portions (211~241) connected to the first to fourth connectors (110~140) may be provided at the first to fourth subsidiary substrates (210~240), respectively. Here, as illustrated in FIGS. 9 and 10, the first to fourth connectors (110~140) may be male connectors, and the first to fourth connecting portions (211~241) may be female connectors. Alternatively, although it is not illustrated, the reversed configuration thereof may be possible.

Meanwhile, as illustrated in FIG. 10, the first to fourth connecting portions (211~241) may be arranged at a position biased to a distal end of the first to fourth subsidiary substrates (210~240), in order to allow the first to fourth subsidiary substrates (210~240) to be extended in a direction via the connection with the PCB (10).

Figure 11:
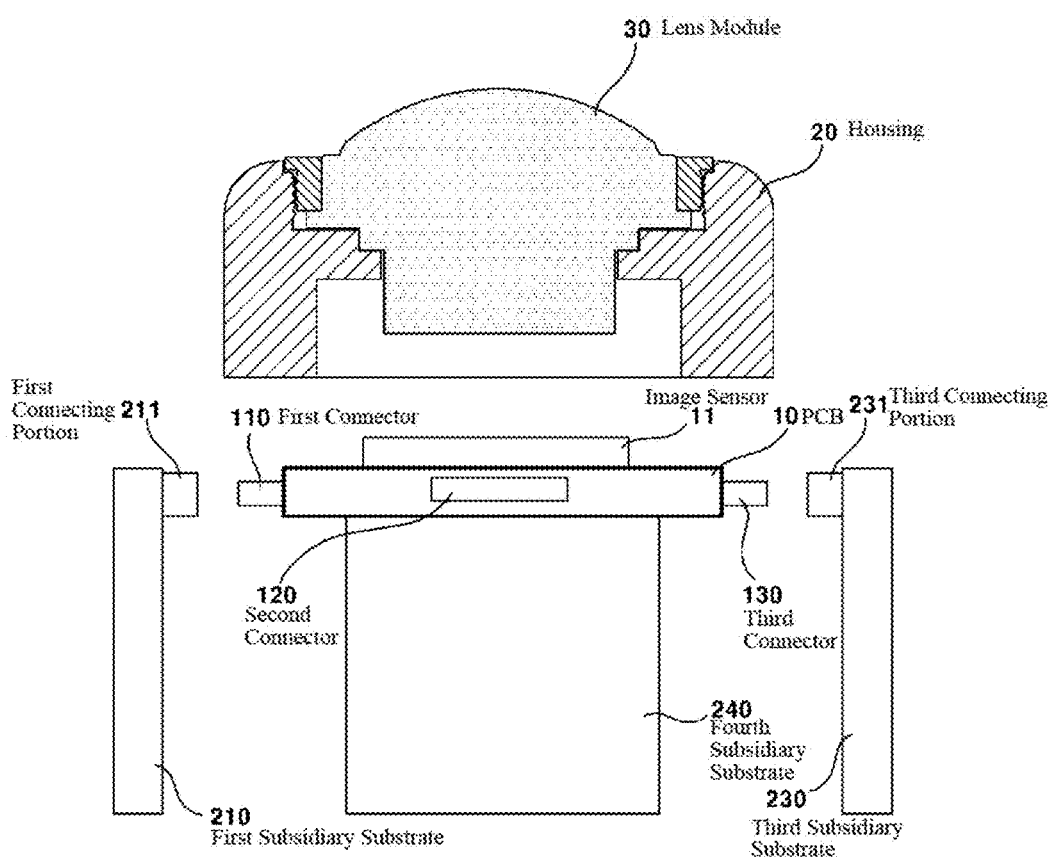
FIG. 11 is an exploded view illustrating a camera module according to a fourth exemplary embodiment.
Figure 12:
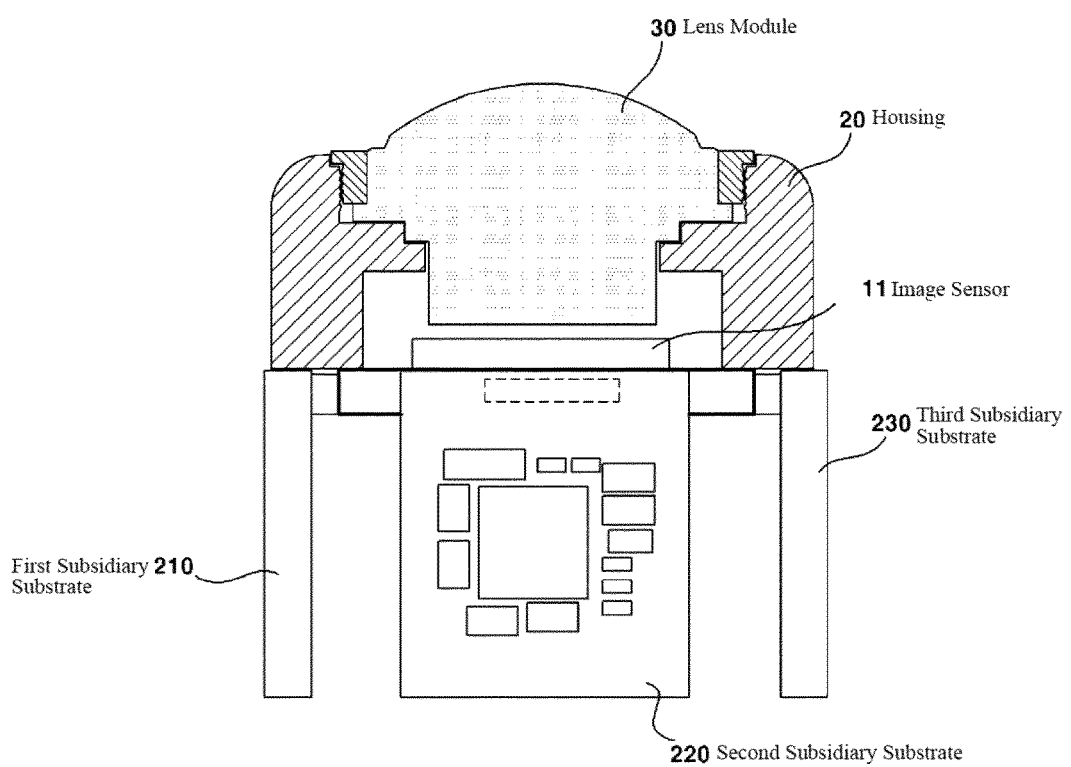
FIG. 12 is an assembly view illustrating a camera module according to a fourth exemplary embodiment.

Consequently, as illustrated in FIGS. 11 and 12, the housing (20) and the lens unit (30) may be coupled by being fixed to an upper side of the PCB (10), as in the foregoing first to third exemplary embodiments. In addition, the first to fourth subsidiary substrates (210~240) may be connected to a lower side of the PCB (10).

According to such configuration, the housing (20) may not be required to include an accommodating portion for accommodating the first to fourth subsidiary substrates (210~240). Rather, the cable housing (40) may include a spaced portion accommodating the first to fourth subsidiary substrates (210~240) for assembly of the camera module.

FIGS. 13 to 16 are views illustrating a camera module according to a fifth exemplary embodiment. Unlike the foregoing first to fourth exemplary embodiments, according to the fifth exemplary embodiment, the first and second subsidiary substrates (1210, 1220) may be connected to the PCB (10) via first and second connecting cables (1211, 1221) formed of flexible RF-PCB (Rigid-Flex Printed Circuit Board).

Figure 13:
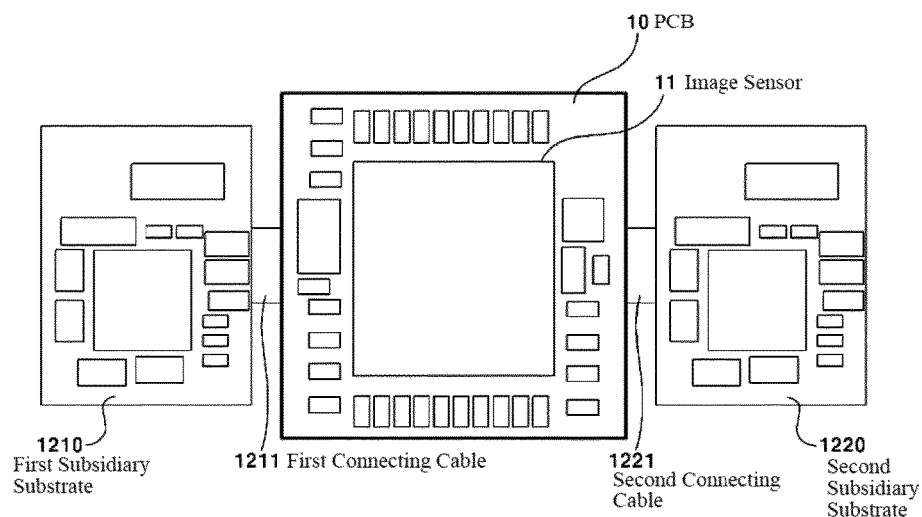
FIGS. 13 and 14 are plan views respectively illustrating a PCB and a subsidiary substrate of a camera module according to a fifth exemplary embodiment.
Figure 14:
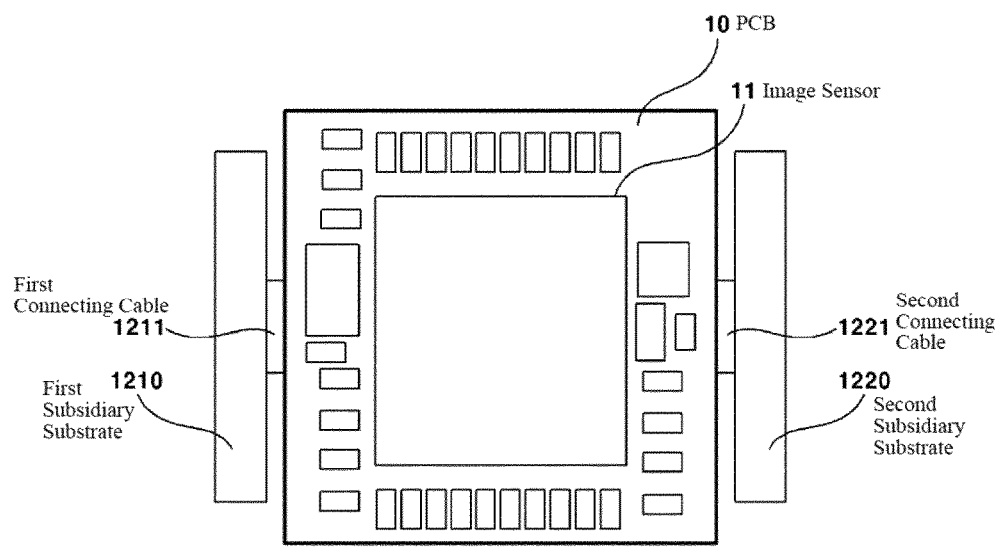
Figure 15:
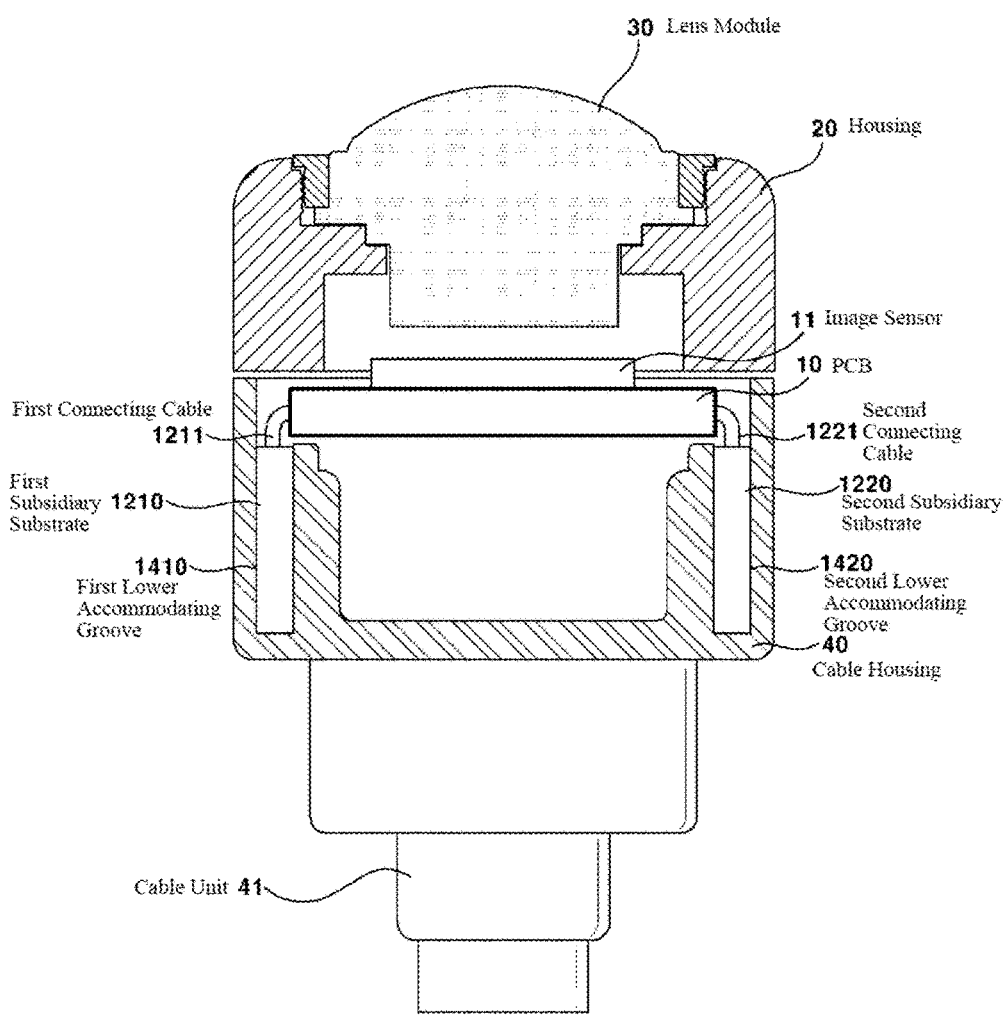
FIGS. 15 and 16 are assembly views illustrating a camera module according to a fifth exemplary embodiment.
Figure 16:
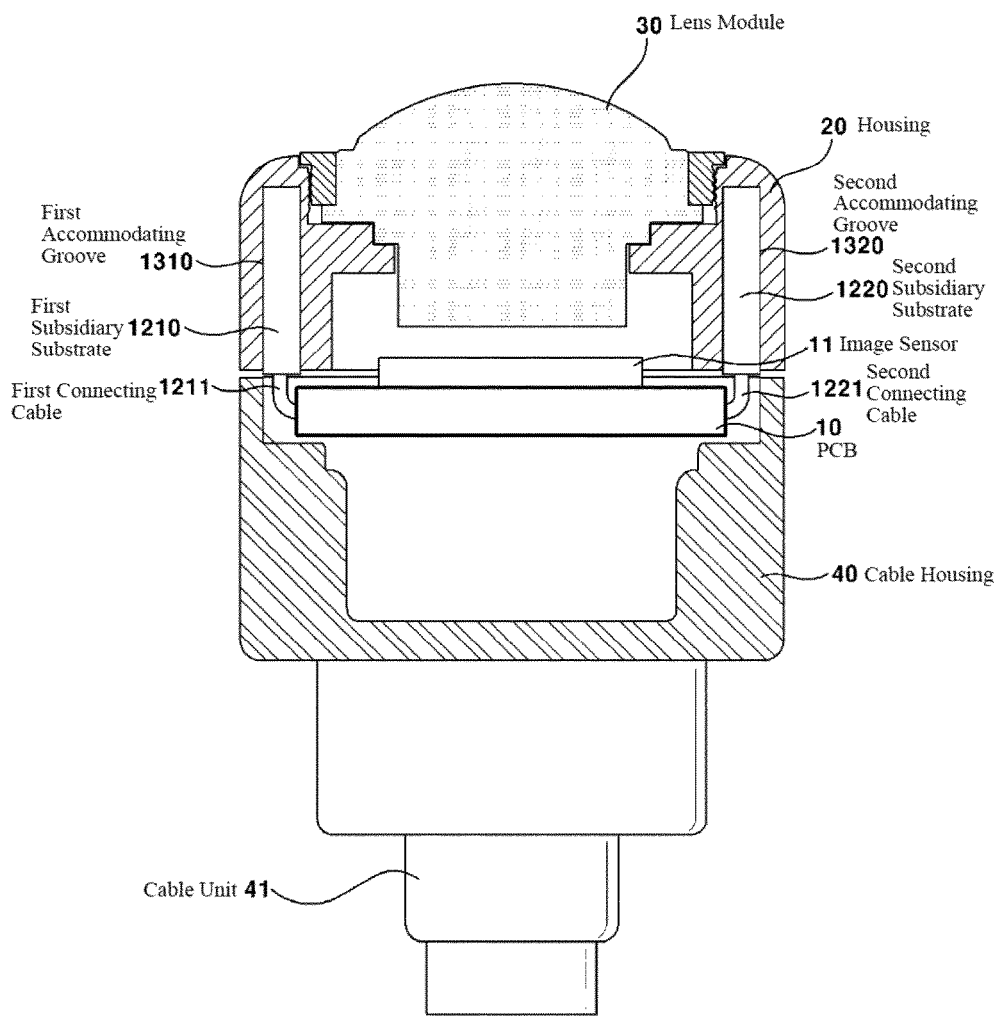

That is, the first and second subsidiary substrates (1210, 1220) directly connected to the PCB (10) as illustrated in FIG. 13 may be formed by bending the first and second connecting cables (1211, 1221) as illustrated in FIG. 14. Here, the first and second connecting cables (1211, 1221) may be bent in a direction opposite to the image sensor (11) as illustrated in FIG. 15. Alternatively, the first and second connecting cables (1211, 1221) may be bent in a same direction as that of the image sensor (11), as illustrated in FIG. 16.

In a case where the first and second subsidiary substrates (1210, 1220) are bent in a direction opposite to the image sensor (11) as illustrated in FIG. 15, the first and second lower accommodating grooves (1410, 1420) may be formed at the cable housing (40). Alternatively, in a case where the first and second subsidiary substrates (1210, 1220) are bent in a same direction as that of the image sensor (11) as illustrated in FIG. 16, the first and second accommodating grooves (1310, 1320) may be formed in the housing (40).

According to the first to fifth exemplary embodiments, a plurality of subsidiary substrates (210~240) may be configured and connected. Thereby, various types of element components can possibly installed in a limited space. That is, an actuating driving driver, a graphic driver for accelerating image processing, and an element component such as an ISP may be additionally installed to enhance performance of the camera module, in a case where a high-pixel image sensor is used.

In addition, a camera module with a basic option may be launched without such subsidiary substrates, and only the user's required function can be installed by being modularized in an individual subsidiary substrate. Thereby, various functions can be selectively provided.

In addition, the subsidiary substrates (210~240) may be installed in a predetermined direction with respect to a substrate surface of the PCB (10). According to an exemplary embodiment, the subsidiary substrates (210~240) may be installed in a vertical direction with respect to a substrate surface of the PCB (10). Thereby, the internal space of the housing (20) or the cable housing (40) may be used for installation of the subsidiary substrates (210~240). Therefore, various functions can be provided without increasing the entire length of the camera module, and the miniaturization of the camera module can be aimed as well, because the subsidiary substrates are not laminated in a direction parallel to the PCB (10) as in the conventional camera module.

Although exemplary embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

The invention claimed is:

1. A camera module, comprising:
a housing;
a lens module, wherein at least a portion of the lens module is disposed in an inner space of the housing;
a PCB disposed under the lens module;
an image sensor disposed on an upper surface of the PCB; and
a subsidiary substrate electrically connected to the PCB and disposed above the PCB,
wherein the subsidiary substrate is disposed to be inclined with respect to the upper surface of the PCB,
wherein the housing comprises a groove formed on a lower surface of the housing and that is recessed to receive the subsidiary substrate,
wherein the groove of the housing is spaced apart from the inner space of the housing, and
wherein at least a portion of the lens module is overlapped with the subsidiary substrate in a horizontal direction.

2. The camera module of claim 1, wherein the subsidiary substrate is connected to the PCB in a direction vertical to the PCB.

3. The camera module of claim 1, wherein the subsidiary substrate is electrically connected to the PCB via a connector, and
wherein the connector is disposed on a same surface as that on which the image sensor is arranged.

4. The camera module of claim 3, wherein the connector is arranged in a direction in parallel to a distal end of the PCB.

5. The camera module of claim 3, wherein the subsidiary substrate comprises first, second, third, and fourth subsidiary substrates, with the fourth subsidiary substrate being opposite to the third subsidiary substrate based on the image sensor, and
wherein each of the first to fourth subsidiary substrates is configured to be disposed on each side of the rectangular shape of the PCB, respectively.

6. The camera module of claim 1, wherein the subsidiary substrate comprises a first subsidiary substrate and a second subsidiary substrate opposite to the first subsidiary substrate based on the image sensor, and
wherein the PCB is formed with a rectangular shape.

7. The camera module of claim 6, wherein a shape of the groove of the housing corresponds to that of the subsidiary substrate.

8. The camera module of claim 1, wherein the subsidiary substrate comprises a plurality of subsidiary substrates.

9. The camera module of claim 1, further comprising:
a cable housing connected to the PCB, and installed with a cable for an external connection.

10. The camera module of claim 5, wherein the subsidiary substrate is electrically connected to the PCB via a connector, and
wherein the connector is disposed on the upper surface of the PCB.

11. The camera module of claim 10, wherein the subsidiary substrate comprises a connecting portion corresponding to the connector.

12. The camera module of claim 11, wherein the connecting portion is formed of a flexible material.

13. The camera module of claim 10, further comprising:
a connection portion electrically connected to the connector and disposed on a lower surface of the subsidiary substrate,
wherein the connector comprises a female connector, and
wherein the connection portion comprises a male connector.

14. The camera module of claim 10, further comprising:
a connection portion electrically connected to the connector and disposed on a lower surface of the subsidiary substrate,
wherein the connector comprises a male connector, and
wherein the connection portion comprises a female connector.

15. The camera module of claim 10, wherein the connector comprises a first connector coupled with the first subsidiary substrate and a second connector coupled with the second subsidiary substrate, and
wherein the image sensor is disposed between the first connector and the second connector.

16. The camera module of claim 15, wherein the connector further comprises a third connector coupled with the third subsidiary substrate and a fourth connector coupled with the fourth subsidiary substrate, and
wherein the image sensor is disposed between the third connector and the fourth connector.

17. The camera module of claim 16, wherein the first subsidiary substrate is in parallel to the third subsidiary substrate.

18. The camera module of claim 17, wherein the first subsidiary substrate is perpendicular to the second subsidiary substrate.

19. A camera module, comprising:
a housing;
a lens module coupled to the housing;
a PCB disposed under the lens module;
an image sensor disposed on an upper surface of the PCB; and
a subsidiary substrate electrically connected to the PCB and disposed above the PCB,
wherein the subsidiary substrate is disposed to be inclined with respect to the upper surface of the PCB,
wherein the housing comprises a groove formed on a lower surface of the housing and that is recessed to receive the subsidiary substrate,
wherein the groove of the housing is spaced apart from the lens module, and
wherein at least a portion of the lens module is overlapped with the subsidiary substrate in a horizontal direction.

* * * * *